United States Patent [19]

Chen

[11] Patent Number: 5,555,994
[45] Date of Patent: Sep. 17, 1996

[54] DOME COVER FOR COOKING UTENSILS

[76] Inventor: Ming-Chen Chen, No. 29, Alley 39, Lane 206, Sec. 2, Tai-Ho Rd., Ah-Yi Li, Changhua, Taiwan

[21] Appl. No.: 506,559

[22] Filed: Jul. 25, 1995

[51] Int. Cl.[6] .................... A47J 27/00; B65D 51/00
[52] U.S. Cl. .................... 220/287; 99/426; 99/449; 99/450; 99/645; 126/369; 126/384; 220/912
[58] Field of Search .................... 99/339, 340, 345–347, 99/403, 426, 449, 450, 645; 220/287, 355, 912, 367, 373, 254, 256, 300, 302; 126/384, 385, 369, 373, 287

[56] References Cited

U.S. PATENT DOCUMENTS

| | | | |
|---|---|---|---|
| 1,735,589 | 11/1929 | Tollagsen | 99/347 |
| 4,198,040 | 4/1980 | Colasent | 220/254 |
| 4,700,689 | 10/1987 | Speker | 126/384 |
| 4,828,140 | 5/1989 | Henderson | 220/287 X |
| 5,377,859 | 1/1995 | Haocker | 220/287 X |

*Primary Examiner*—Timothy F. Simone
*Attorney, Agent, or Firm*—Morton J. Rosenberg; David I. Klein

[57] ABSTRACT

A dome cover for cooking utensils, including a dome-like cover body made from a meshed steel plate by stamping and defining a plurality of small open spaces in it, and a knob raised from the top center of the dome-like cover body, the dome-like cover body having a stepped outward flange around the border, which stepped outward flange has a rim around the border reinforced by a steel wire.

3 Claims, 3 Drawing Sheets

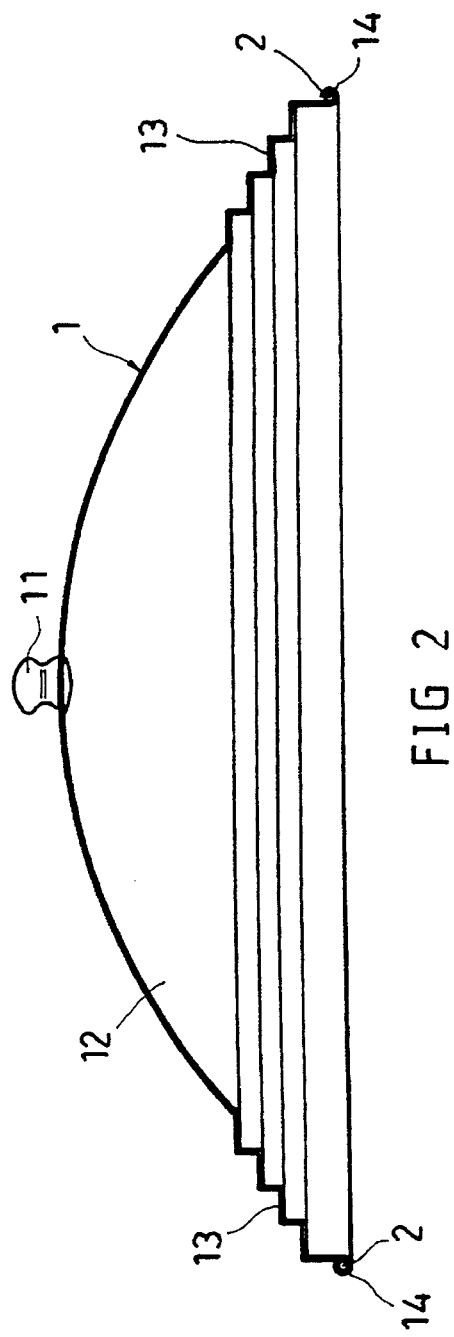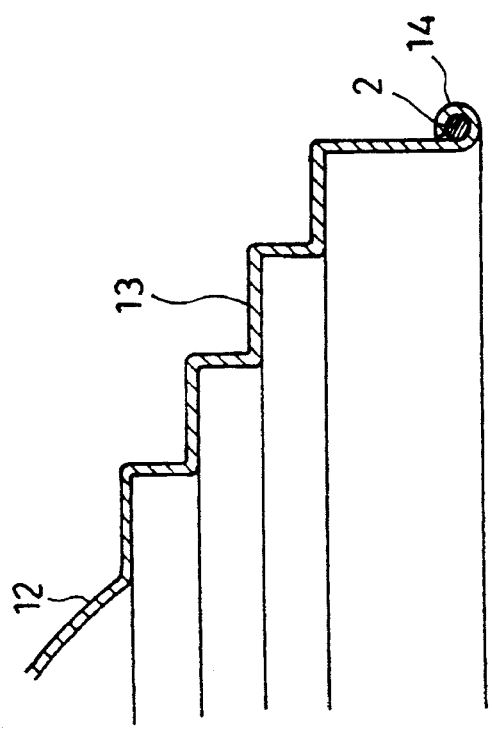
FIG 2
FIG. 2A

DOME COVER FOR COOKING UTENSILS

BACKGROUND OF THE INVENTION

The present invention relates to dome covers for cooking utensils, and relates more particularly to a meshed dome cover which has a stepped outer flange portion for fitting over pots and pans of different diameters. When liquid is boiled in a pot or pan covered by such a cover, the dome cover will be lifted by rising currents of hot air. This causes the dome cover to repeatedly and noisedly impact the pot or pan.

Conventional dome covers are also specifically designed for covering pots or pans of one particular diameter. Therefore, conventional covers are not suitable for covering a variety of pots or pans.

SUMMARY OF THE INVENTION

It is one object of the present invention to provide a dome cover for cooking utensils which fits cooking utensils of different sizes.

It is another object of the present invention to provide a dome cover for cooking utensils which will not be lifted and disturbed by rising currents of hot air during cooking.

To achieve these objects, there is provided a dome cover for cooking utensils which comprises a dome-like cover body having a meshed portion which defines a plurality of small openings and a knob protruding from the top center of the dome-like cover body, the dome-like cover body having a stepped outer flange portion around its periphery, which stepped outer flange portion includes a rim reinforced by a steel wire.

BRIEF DESCRIPTION OF THE DRAWINGS

FIG. 2 is a cross-sectional view of the dome cover shown in FIG. 1;

FIG. 2-A is a cross-sectional view, partially cut-away, of a portion of the dome cover shown in FIG. 2; and, FIG. 3 is a schematic diagram illustrating the dome cover of the present invention fitting pots and pans of different diameter.

DETAILED DESCRIPTION OF THE PREFERRED EMBODIMENT

Figure 1:
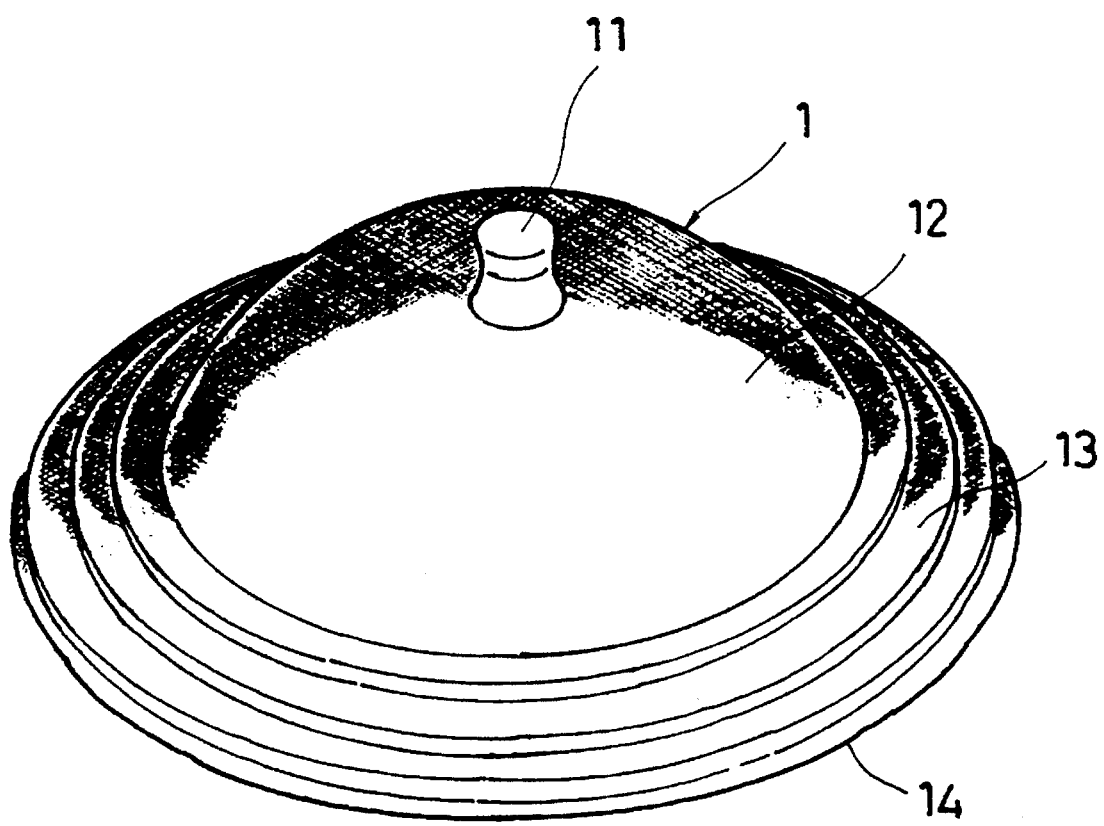
FIG. 1 is a perspective view of a preferred embodiment of the dome cover for cooking utensils according to the present invention.
Figure 3:
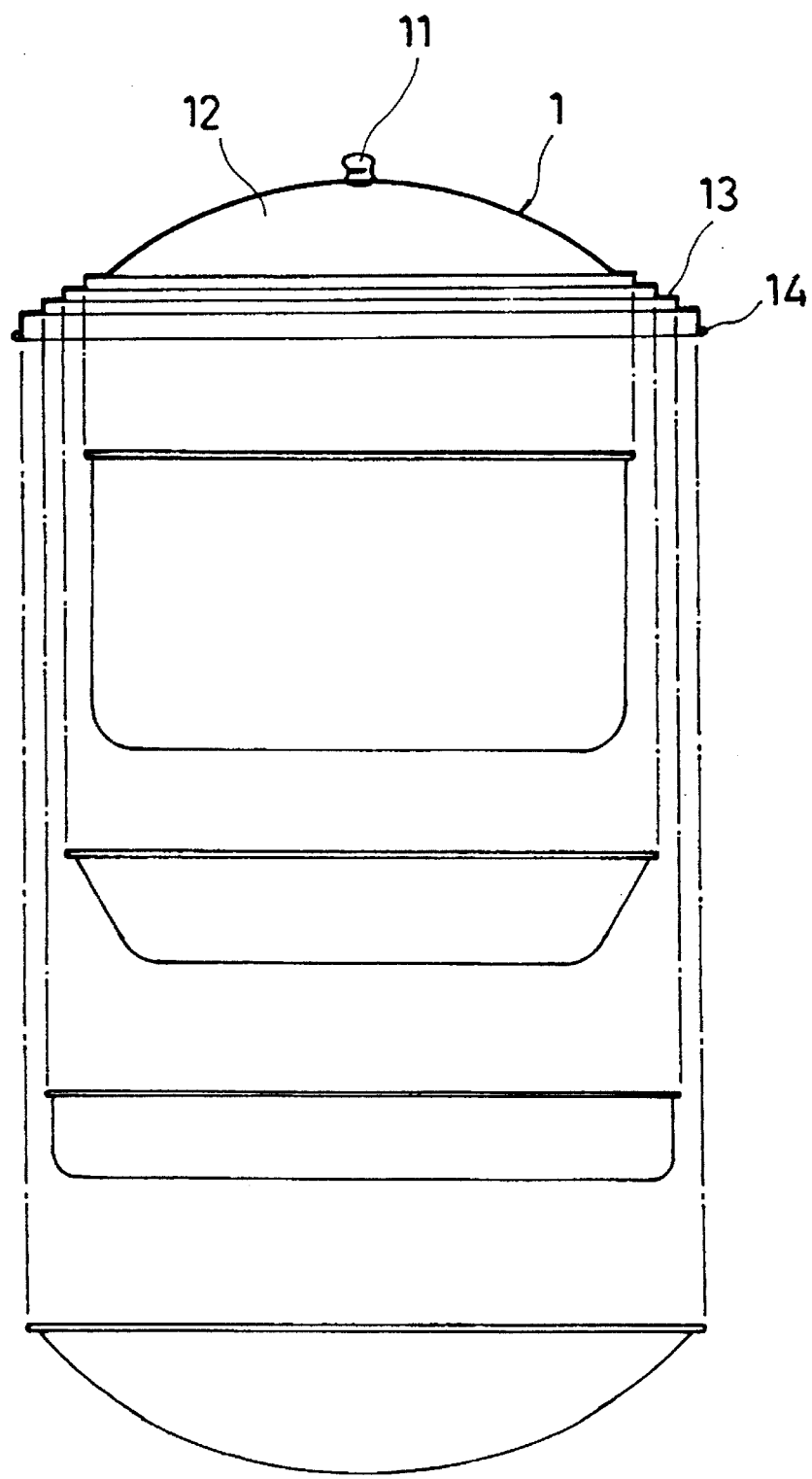

Referring to FIGS. 1, 2, and 2-A, a dome cover 1 for cooking utensils in accordance with the present invention comprises a dome-like cover body 12 made from a meshed steel plate by stamping and a knob 11 protruding from the top center of the dome-like cover body 12. Because the dome-like cover body 12 is made from a meshed steel plate by stamping, it has a plurality of small openings. When the dome cover 1 is covered on a pot or the like during typical use, moisture from rising steam will collect around the open spaces of the dome-like cover body 12, while upward currents of air from the steam pass through those open spaces. Thus, the dome cover 1 would not be lifted from the pot or the like, and the undesirable noise and impact that might otherwise result from the rising air disturbing the cover's placement on the given pot or the like are prevented.

The dome-like cover body 12 has a stepped outer flange portion 13 around its periphery for fitting pots and pans of different diameters. The outermost periphery of the stepped outer flange portion 13 includes a rim 14 which is reinforced by a steel wire 2. The steel wire 2 protects the rim 14 of the dome-like cover body 12 against deformation.

I claim:

1. A cover for covering cooking utensils of various configurations comprising:

(a) a cover body extending substantially radially about an axis, said cover body having a knob protruding axially therefrom, said cover body including a meshed portion defining a plurality of through openings;

(b) a stepped outer flange portion extending substantially radially from said cover body portion, said stepped outer flange portion including an outer tier and at least one inner tier for respectively engaging said cooking utensils having different configurations, said outer and inner tiers being coaxially disposed and respectively defining about said axis first and second diametric dimensions, said first diametric dimension being greater than said second diametric dimension, said outer tier being offset axially from said inner tier by a sidewall portion extending substantially axially therebetween; and, (c) reinforcement means coupled to said outer flange portion, said reinforcement means being coaxially disposed about said outer flange portion.

2. The cover as recited in claim 1 wherein said meshed portion of said cover body is formed of a metallic composition.

3. The cover as recited in claim 1 wherein said meshed portion of said cover body is formed by stamping a steel plate.

* * * * *

UNITED STATES PATENT AND TRADEMARK OFFICE
CERTIFICATE OF CORRECTION

PATENT NO. : 5,555,994
DATED : September 17, 1996
INVENTOR(S) : Ming-Ching Chen

It is certified that error appears in the above-indentified patent and that said Letters Patent is hereby corrected as shown below:

Title page, item [76], inventor: Delete the first name "Ming-Chen" and insert the name --Ming-Ching--.

Signed and Sealed this

Nineteenth Day of November, 1996

*Attest:*

BRUCE LEHMAN

*Attesting Officer*      *Commissioner of Patents and Trademarks*